United States Patent [19]

Hagita

[11] Patent Number: 4,862,299
[45] Date of Patent: Aug. 29, 1989

[54] CLOCK SIGNAL REGENERATOR

[75] Inventor: Hiroyuki Hagita, Hachiohji, Japan

[73] Assignee: Kabushiki Kaisha Kenwood, Japan

[21] Appl. No.: 150,155

[22] Filed: Jan. 29, 1988

[30] Foreign Application Priority Data

Jan. 31, 1987 [JP] Japan .................................. 62-19633

[51] Int. Cl.⁴ .......................... G11B 15/14; G11B 5/09
[52] U.S. Cl. .......................................... 360/64; 360/51
[58] Field of Search ....................... 360/64, 51, 32, 67, 360/26

[56] References Cited

U.S. PATENT DOCUMENTS 4,692,914  9/1987  Yasumura et al. ..................... 360/64

Primary Examiner—Vincent P. Canney
Attorney, Agent, or Firm—Gerald J. Ferguson, Jr.

[57] ABSTRACT

In a clock signal regenerator of reproducing apparatus for reproducing a PCM converted signal recorded on magnetic recording medium through helical scan of a slant azimuth method, an output voltage from a loop filter in a PLL circuit which derives clock signals based on the PCM reproduced signals is switched in response to switching between magnetic heads having a different azimuth angle.

4 Claims, 4 Drawing Sheets

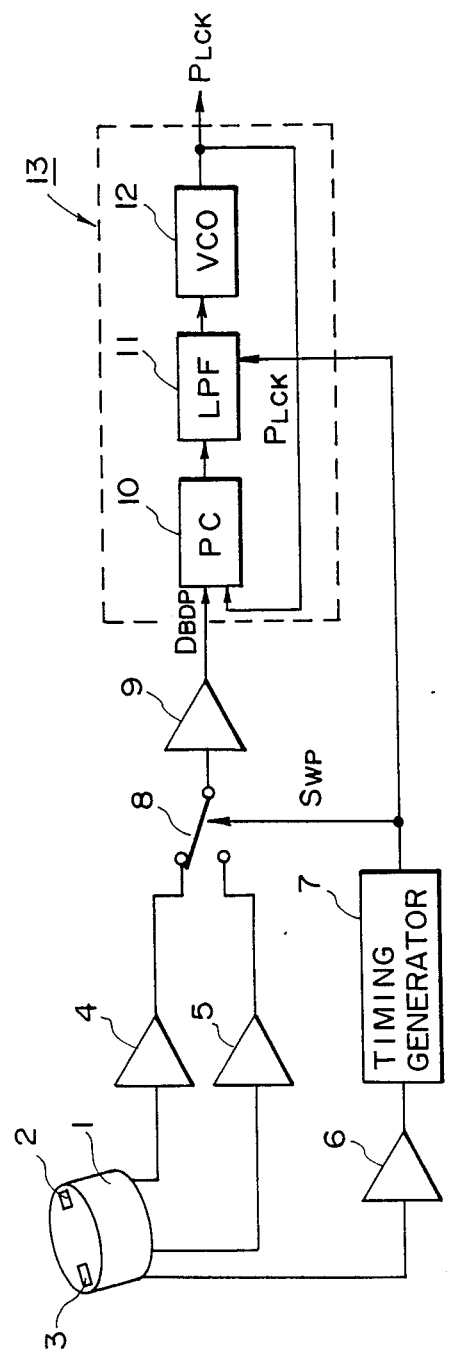
F I G. 1

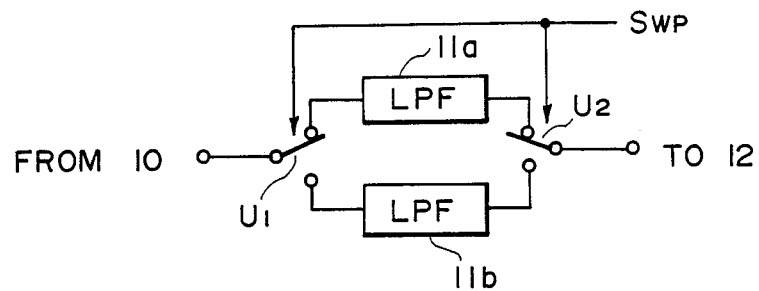
F I G. 4
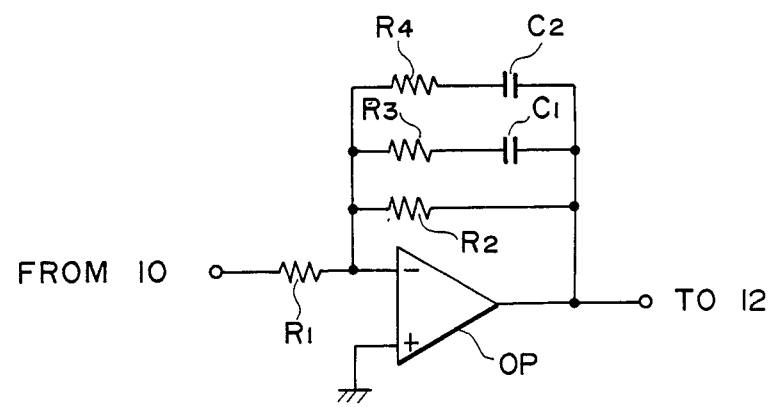
F I G. 5

FIG. 6A RF SIG. 
FIG. 6B SWP 

CLOCK SIGNAL REGENERATOR

BACKGROUND OF THE INVENTION

1. Field of the Invention

The present invention relates to apparatus for reproducing a PCM signal recorded on magnetic recording medium through helical scan of a slant azimuth method, and more particularly to a clock signal regenerator suitable for high speed data search operation of a rotary magnetic head type digital audio tape recorder or the like by which audio signals are reproduced in the form of PCM signals.

2. Related Art

In a digital audio recording-reproducing apparatus including such as a rotary magnetic type digital audio tape recorder (R-DAT), information is recorded on a recording medium such as a magnetic tape in the form of digital signals in synchronism with clock signals. In general, clock signals are not recorded on the recording medium so that it is necessary to regenerate clock signals based on the signals reproduced from the recording medium. The clock signals are regenerated generally by using a phase-locked loop (PLL) circuit by which transitions of the reproduced signals are subjected to phase comparison with a voltage-controlled oscillator VCO output.

In the reproduction of the recorded PCM digital signal on a two head-type apparatus, the signal is alternately read out from a magnetic tape via each one of the two magnetic heads mounted to a rotary drum. Such alternative switching is made by a head-switching signal generated from the rotary drum. The read-out PCM digital signal burst generated from each of the two heads is applied to a PLL circuit to regenerate a clock signal therefrom. The PLL is locked in frequency to each of alternately generated PCM signal bursts from the two heads. For the purpose of improving the recording density, a known slant azimuth recording manner is taken. That is, a different slant azimuth is assigned to each of the two magnetic heads to perform the guard-band-less recording. In the magnetic heads with different azimuth angles, the relative speed change degree occurring when the running speed of a magnetic tape is changed for a high speed search operation is slightly different for each magnetic head. The PLL circuit will alternately track in frequency to each of the frequency-different output signal bursts from the two heads. Accordingly, since at the beginning point of the output burst from one head there is a frequency error or shift from the locking state to the other head, it takes some time to get a pull-in state in the PLL circuit for the output burst from said one head. Due to this time, it becomes impossible to regenerate a proper clock signal and thus to discriminate the read-out PCM digital signal for PCM signal encoding at the beginning of the output signal bursts.

Other problems in the conventional clock regenerators will become clear in relation to the description below of the embodiment of the present invention.

SUMMARY OF THE INVENTION

It is an object of the present invention to solve the above problems and provide a clock signal regenerator capable of achieving a stable phase synchronization even during high speed information search.

To solve the above problems, the present invention is constructed as in the following:

In a clock signal regenerator of apparatus for reproducing PCM signals recorded on magnetic recording medium through helical scan of a slanted azimuth method, an output voltage from a loop filter in a PLL circuit which regenerates clock signals based on the PCM reproduced signals is changed in response to switching between magnetic heads having a different azimuth angle.

Since the output voltage from the loop filter in the PLL circuit is changed in response to switching between the magnetic heads having a different azimuth angle, the output voltage from the loop filter with respect to one magnetic head having one azimuth angle becomes independent from that from the loop filter with respect to the other magnetic head having another azimuth angle. Therefore, the lock-in of the PLL circuit to one magnetic head does not affect the lock-in of the PLL circuit to the other magnetic head.

Consequently, it becomes possible to stably regenerate clock signals based on the reproduced signal information even during high speed information search.

BRIEF DESCRIPTION OF THE DRAWINGS

FIG. 1 is a block diagram showing the embodiment of a clock signal regenerator according to the present invention.

FIG. 4 is a block diagram showing the structure of another embodiment of a loop filter according to the present invention.

FIG. 5 is a block diagram showing the structure of a conventional loop filter. FIGS. 6A to 6C and FIGS. 7A to 7C show waveforms used for explaining the operation of a conventional example.

DESCRIPTION OF THE PREFERRED EMBODIMENTS

Figure 2:
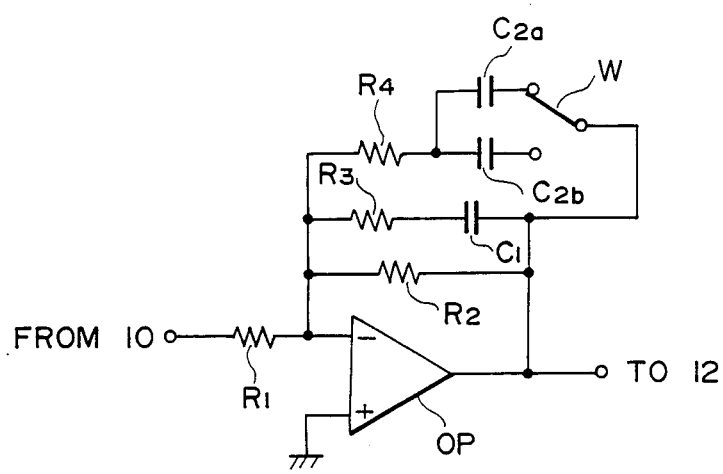
FIG. 2 is a circuit diagram showing an embodiment of a loop filter used for embodying the present invention.

FIG. 1 illustrates the embodiment of a clock signal regenerator of an R-DAT according to the present invention.

Signals read by magnetic heads 2 and 3 fixed at a rotary drum 1 are applied to RF amplifiers 4 and 5 via rotary transformers (not shown). Since both the magnetic heads 2 and 3 are not in contact with a magnetic tape at the same time, the signal read out is performed alternately through the RF amplifier 4 or 5. To this end, a PG signal generator (not shown) is housed within the rotary drum 1 to output signals at predetermined rotary phase angles. The signal outputted from the PG signal generator is subjected to amplification/waveform-shaping by an amplifier 6 and supplied to a timing generator 7. The timing generator 7 generates a head switching signal $S_{WP}$ in accordance with the output signal from the PG signal generator to thereby activate a switch 8.

The outputs from the RF amplifiers 4 and 5 are alternately taken out in response to the head switching signal $S_{WP}$, and supplied to a comparator 9 where the selected signal is subjected to waveform shaping and digitized. The digital signal is represented hereinafter by $D_{BDP}$.

The digital signal $D_{BDP}$ is inputted to a PLL circuit 13 and compared with an output $P_{LCK}$ from a voltage-controlled oscillator (VCO) 12 by a phase comparator (PC) 10. An output from the phase comparator 10 is applied as a control voltage to the voltage-controlled oscillator 12 via a loop filter (LPF) 11 to lock the oscillation frequency of the oscillator 12 to the signal $D_{BDP}$ in frequency. Clock signals are regenerated as output signals $P_{LCK}$ from the voltage-controlled oscillator 12 of the PLL circuit.

The loop filter 11 which has been conventionally used in a PLL circuit such as 13 in FIG. 1 comprises, e.g., as shown in FIG. 5, an operational amplifier OP, an input resistor $R_1$, a feedback resistor $R_2$, and first and second time constant circuits coupled at the feedback loop of the PLL circuit 13. The first time constant circuit determines mainly the high frequency characteristic and comprises a resistor $R_3$ and a capacitor $C_1$, while the second time constant circuit determines the holding characteristic in a DC level and comprises a resistor $R_4$ and a capacitor $C_2$.

Figure 6C:

A magnetic tape is wound about the rotary drum of an R-DAT approximately at an angle of 90 degrees so that RF signals are intermittently outputted as shown in FIG. 6A. The signal from the magnetic head 2 is selectively outputted while the head switching signal $S_{WP}$ is low level, and the signal from the magnetic head 3 during high level. In an ordinary reproducing mode, the RF signal is continuously obtained during the period when the magnetic head is in contact with the recording area of the magnetic tape. During the period while the RF signal is being obtained, the phase comparator 10 is activated to allow the PLL circuit 13 to lock to the RF signal in frequency. During the period when the Rf signal is not obtained, the phase comparison operation is substantially stopped and the PLL circuit is held at a DC level by the capacitor $C_2$ of the second time constant circuit shown in FIG. 5 until the next RF signal burst is obtained from the other head. FIG. 6C shows a control voltage of the voltage-controlled oscillator 12. As shown in FIG. 6C, during the period when the RF signal is outputted, the control voltage contains residual noises outside of the loop bandwidth after the phase comparison, and during the period when the RF signal is not outputted, the control voltage is held at a DC level.

For feasibility of searching main information such as music information, sub-information such as program numbers and time codes is also recorded on a magnetic tape by an R-DAT. High speed information search can be achieved through the discrimination of the sub-information from those signals intermittently read from the magnetic tape by feeding or running the magnetic tape in a high speed. In this case, if the rotary drum 1 is rotated at the same rate (2000 r.p.m.) as that during an ordinary reproducing mode, the speed of the head locus relative to the recording track will change and therefore the transmission rate of reproduced signals changes, causing some problems such as an unlock state of the PLL circuit due to shifting outside the lock-in region.

In view of the above problem, the relative speed is arranged to be maintained within a certain range by controlling, e.g., changing the revolution speed of the rotary drum in accordance with the running speed of a magnetic tape. Generally in an R-DAT, the drum revolution speed is set at about 3000 r.p.m. and at about 1000 r.p.m. respectively for the forward and reverse magnetic tape running speeds 200 times faster than that during the ordinary reproducing mode.

There is known slant azimuth recording for the purpose of improving the recording density. That is, a different slant azimuth is assigned to each magnetic head 2 and 3 to perform the guard-band-less recording. With the slant azimuth recording, the above-mentioned relative speed is concerned not with the vector component of the head locus along the direction of the recording truck but with the vector component of the magnetic head along the direction of the magnetic head gap. Therefore, in the magnetic heads with different azimuth angles, the relative speed change degree occurring when the running speed of a magnetic tape is changed for the high speed search is slightly different for each magnetic head 2 and 3. The difference between transmission rates as with the magnetic heads 2 and 3 of an R-DAT during a 200 times faster running speed becomes about 4%. In this case, the PLL circuit 13 will track both the outputs from the magnetic heads 2 and 3. Since there remains a frequency error or shift near the start of an output from each magnetic head as compared with the preceding output from the other magnetic head, in the PLL circuit it takes time for the pull-in operation regarding a frequency synchronization. Thus, a period during which information cannot be discriminated occurs near the start of each output.

Figure 7A:
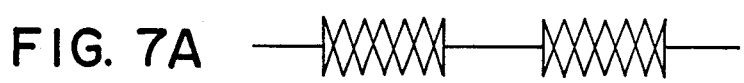
Figure 7B:
Figure 7C:
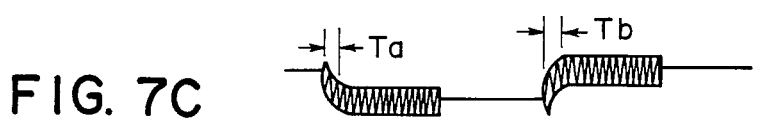

Particularly in the case of an R-DAT, the sub-information is arranged to be recorded mainly at the start and end portions of each output from the magnetic head. Therefore, the above-mentioned phenomenon causes a complete disability of discriminating the information near the start portion, and hence search operation error becomes likely to occur. This phenomenon will be discussed with reference to FIGS. 7A to 7C. As a magnetic tape is driven at a high speed, the magnetic head locus traverses the trucks so that the outputted RF signal waveform becomes intermittent as shown in FIG. 7A. When the output has level to some degree, the information can be read. Alternatively, if the output has a level smaller than a certain level, a circuit (not shown) may be provided for suspending the phase comparison operation. Assuming now that the PLL circuit 13 is being locked to the output from the magnetic head 3, the control voltage Vd of the voltage-controlled oscillator 12 remains as it is by a DC holding voltage made by the change in the capacitor $C_2$ after the output from the magnetic head 3 has been terminated. The output frequency of the oscillator 12 is maintained by this DC voltage and thus equal to the transmission rate of the signal from the head 3. Then, as the output from the magnetic head 2 is applied to the PLL circuit 13, a frequency error becomes present because of a difference between the transmission rates of the outputs from the magnetic heads 2 and 3. Due to the frequency error, the PLL circuit 13 performs a so-called pull-in operation whereby both the frequencies come near each other through cycle slips, ultimately obtaining a phase synchronization. The period of this pull-in operation is shown as the period Ta in FIG. 7C during which the information cannot be read due to a synchronization. After the output from the magnetic head 2 has been terminated, the PLL circuit 13 holds a control voltage Vd by the DC holding voltage in the capacitor $C_2$ to thereby maintain substantially the frequency of the output $P_{LCK}$ from the voltage-controlled oscillator 12, which equals to the transmission rate from the head 2. However, as another output from the magnetic head 3 is applied, the transmission rate of this output signal has a frequency error with respect to the previous frequency of the $P_{LCK}$, thus the pull-in operation as described previously must be performed and the information during this period Tb cannot be read.

As understood from the foregoing description of the PLL circuit with the conventional low pass filter, there was a problem that the period is likely occur near the start of an output from the magnetic heads 2 and 3, during which period the information cannot be read.

Other problems may also arise in extreme cases: The PLL circuit 13 can lock only to one of the outputs from the magnetic heads 2 and 3, or it can not lock to both the outputs by merely repeating a cycle slip.

FIG. 2 is a circuit diagram showing an embodiment of an unique type of loop filter used in the PLL circuit 13 of the embodiment of FIG. 1 according to the present invention.

In the loop filter of FIG. 2, in place of the hold capacitor $C_2$ shown in FIG. 5, there are provided capacitors $C_{2a}$ and $C_{2b}$ which are selectively connected to a serial resistor $R_4$ via a switch W driven by the head switching signal $S_{WP}$. While the head switching signal $W_{WP}$ is low level, i.e., while the magnetic head 2 outputs a signal, the capacitor $C_{2a}$ is selected. On the other hand, while the head switching signal $W_{WP}$ is high level, i.e., while the magnetic head 3 outputs a signal, the capacitor $C_{2b}$ is selected.

The capacitors $C_{2a}$ and $C_{2b}$ function to produce the holding voltage of holding a control voltage Vd of the voltage-controlled oscillator 12. By switching the capacitors $C_{2a}$ and $C_{2b}$, they independently produce different holding voltages, each holding a different control voltage for each output for the magnetic heads 2 and 3.

When the signal $S_{WP}$ is low, the PLL circuit is locked to the frequency of the output from the head 2 and then held by the holding voltage in the capacitor $C_{2a}$ until the signal $S_{WP}$ becomes high. Subsequently when the signal $S_{WP}$ becomes high, the switch is connected to the capacitor $C_{2b}$, but the capacitor $C_{2a}$ remains its holding voltage as it is. Again when the signal $S_{WP}$ becomes low after the drum 1 rotates one revolution, the switch W is connected to the capacitor $C_{2a}$ and thus the holding voltage at the time one revolution before of the drum 1 is applied to the oscillator 12 at the start of the next locking cycle in the PLL circuit. When the PLL circuit starts a pull-in operation in the next cycle, since the control voltage Vd in synchro with the output from the magnetic head 2 at the time one revolution before of the rotary drum 1 has been held, there is little frequency error, to accordingly start a lock-in operation at once and enter a lock-in state. When the output from the magnetic head 2 is terminated, the phase comparison operation is stopped and the control voltage Vd is held in the hold capacitor $C_{2a}$ as a DC value. As the head switching signal $S_{WP}$ reverses its polarity and becomes high level, the capacitor $C_{2a}$ is switched off by the switch W. Therefore, the charge stored in the capacitor $C_{2a}$ is maintained as it is until the head switching signal $S_{WP}$ becomes low level again.

When the head switching signal $S_{WP}$ becomes high level, an output from the magnetic head 3 is applied to the PLL circuit 13 which, similar to the case of the magnetic head 2, immediately enters a lock-in state at the start of the output from the magnetic head 3.

Thus, the PLL circuit 13 selecting an output from the magnetic head 3 is not affected by the hold voltage obtained based on an output from the magnetic head 2. Once a lock-in state is achieved, the PLL circuit 13 is dedicated almost only to a lock-in operation at the start of an RF signal at the next cycle. Therefore, the period during which information cannot be read is extremely reduced.

Figure 3A:
FIGS. 3A to 3C show waveforms used for explaining the operation of the embodiment of FIG. 1 and FIG. 2.
Figure 3B:
Figure 3C:
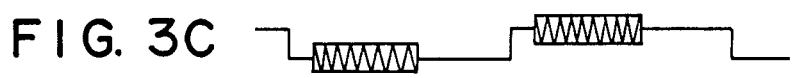

Further, even if the PLL circuit 13 could not lock to or has missed a lock-in to an output from one of the magnetic heads 2 and 3, the lock-in to an output from the other magnetic head is not affected since the PLL circuit 13 performs a pull-in operation independently for each magnetic head. Therefore, as shown in FIG. 3C, the control voltage Vd has a stable DC level before and after an RF signal output period during which noises outside of the loop bandwidth are present, contrary to the case shown in FIG. 7C where a DC level fluctuates.

Another embodiment of this invention will be described.

FIG. 4 is a block diagram of another embodiment of a loop filter which can be applied to the present invention.

In this embodiment, in place of the loop filter of the PLL circuit (FIG. 1) there are provided two loop filters 11a and 11b as shown in FIG. 4 one of which is selected by switches $U_1$ and $U_2$ in response to the head switching signal $S_{WP}$.

Each of the loop filters 11a and 11b is constructed as shown in FIG. 5. When an output from the magnetic head 2 is selected, i.e., when the head switching signal $S_{WP}$ is low level, the loop filter 11a is used. Alternatively, when an output from the magnetic head 3 is selected, i.e., when the head switching signal $S_{WP}$ is high level, the loop filter 11b is used.

One of the loop filters 11a and 11b is selected and used as a loop filter of the PLL circuit 13, in accordance with the head switching signal $S_{WP}$. Therefore, the pull-in operation by the PLL circuit 13 is carried out independently for each selected loop filter 11a or 11b, resulting in a more stable operation than that of the above-described embodiment. In particular, use of the loop filter shown in FIG. 2 causes slight interference in operation between the magnetic heads 2 and 3 under influence of the capacitor $C_1$. The present embodiment has no such interference.

In addition, two PLL circuit are separately provided for respective output signals from the two heads. The clock signals from the PLL circuit are interposed to each other to produce one clock signal or used for respective PCM digital signals from the two heads.

Although the clock signal generator of this invention has been described using an R-DAT, the invention is also applicable to other apparatus employing a different format, e.g., an 8 mm VTR. Another method such as adding an offset to a control voltage of the voltage-controlled oscillator or switching the loop gain may be used together with the present method of switching the output of the loop filter. Further, selective switching of the output from the loop filter may be performed only during the high speed information search mode, and during the ordinary reproducing mode either one of the outputs may be used or a separate component or circuit may be used.

As seen from the foregoing description of the present invention, the output voltage from the loop filter of the PLL circuit is selectively switched in response to the magnetic heads. Therefore, clock signal regeneration can be performed reliably to thus considerably reduce information read out error during high speed drive of a magnetic tape and provide a magnetic recording and reproducing apparatus capable of high speed search with little malfunction.

What is claimed is:

1. Magnetic record/reproduction apparatus including a rotary drum provided with substantially opposed first and second magnetic heads, the first and second magnetic heads being respectively arranged with different azimuth angles for a guardband-less recording, the apparatus comprising:
   a phase-locked loop circuit in response to first and second reproduced signals respectively from said first and second magnetic heads for locking the transmission rates of the first and second reproduced signals to generate first and second reproduction clocks;
   means in response to a rotary phase signal from the rotary drum for generating a timing signal to change over the reproduction mode between the signals from said first and second magnetic heads; and
   means in response to said timing signal for applying to said phase-locked loop circuit a DC voltage level at the start point of the locking to the transmission rate of each of the first and second reproduced signals, the applied DC voltage level corresponding to a DC voltage level which the phase-locked loop circuit held from one rotation of the rotary drum earlier.

2. Magnetic record/reproduction apparatus according to claim 1, wherein said phase-locked loop circuit includes first and second DC level holding capacitors, the first and second holding capacitors being alternately connected to the phase-locked loop circuit in response to the timing signal.

3. Magnetic record/reproduction apparatus according to claim 1, wherein said phase-locked loop circuit includes first and second lowpass filters, the first and second lowpass filters being alternately connected to the phase-locked loop circuit in response to the timing signal.

4. Magnetic recording/reproduction apparatus according to claim 1, wherein the reproduced signals from said first and second magnetic heads are in digital signal format.

* * * * *